Jan. 20, 1942.　　J. W. COMMON　　2,270,509
CORE HANDLING MACHINE
Filed Aug. 2, 1940　　4 Sheets-Sheet 1

Inventor
Joseph W. Common
By
Blackmore, Spencer & Flint
Attorneys

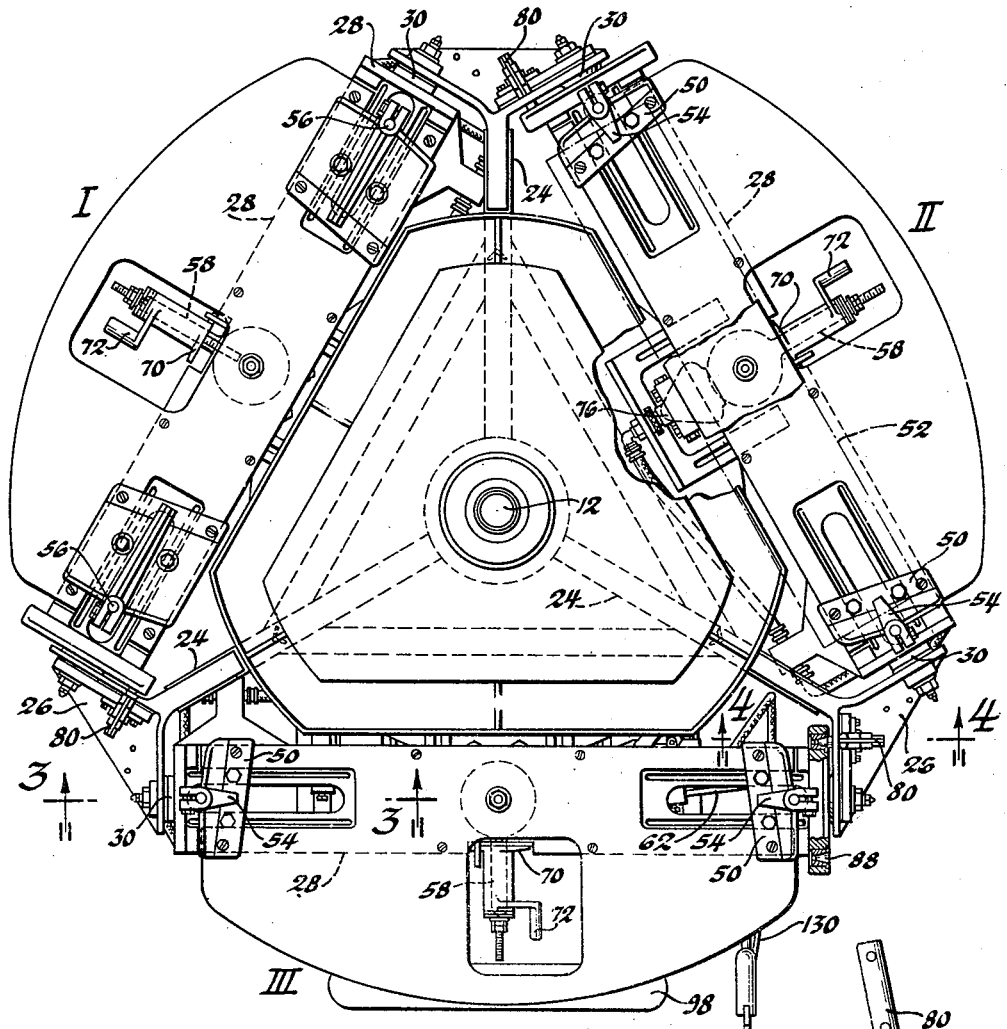
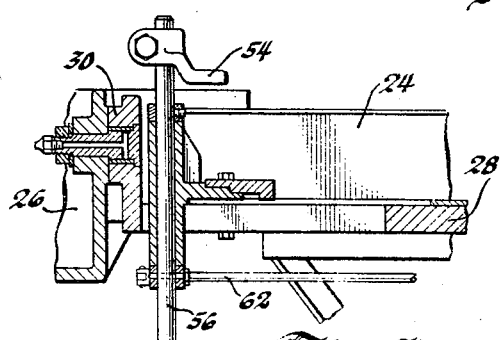
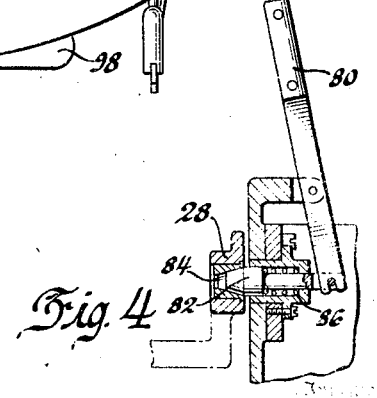

Jan. 20, 1942. J. W. COMMON 2,270,509
CORE HANDLING MACHINE
Filed Aug. 2, 1940 4 Sheets-Sheet 3

Inventor
Joseph W. Common

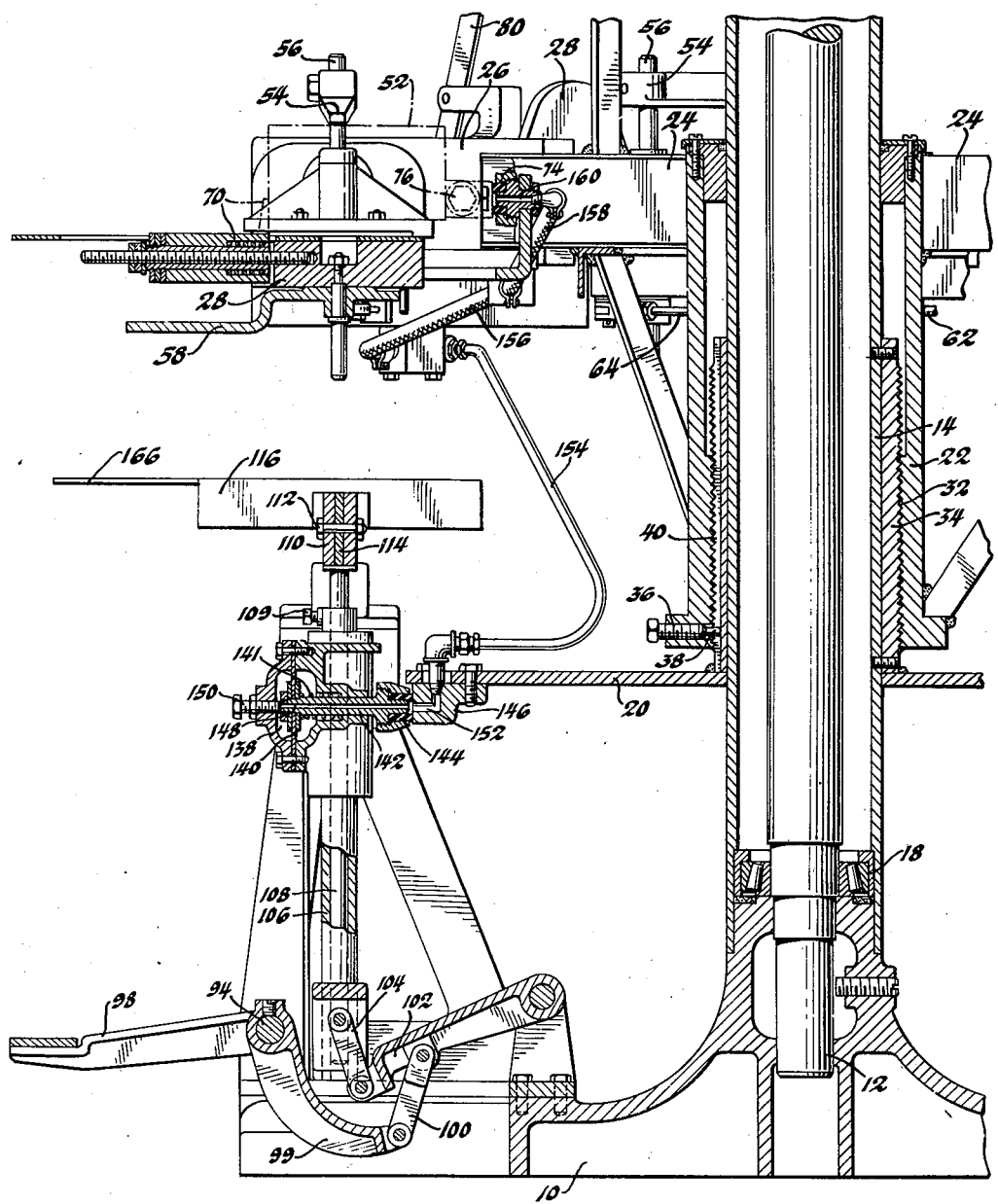
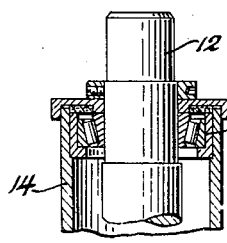
Fig. 7
Fig. 8
Inventor
Joseph W. Common

Patented Jan. 20, 1942

2,270,509

UNITED STATES PATENT OFFICE 2,270,509

CORE HANDLING MACHINE

Joseph W. Common, Flint, Mich., assignor to General Motors Corporation, Detroit, Mich., a corporation of Delaware Application August 2, 1940, Serial No. 349,520

4 Claims. (Cl. 22—10)

This invention has to do with an apparatus for facilitating the making and handling of cores.

Among the objects of the invention are the following: to provide improvements in apparatus for handling cores; to provide improvements in apparatus for drawing cores; to provide a core handling apparatus that is readily adjustable; to provide improvements in apparatus for handling cores of large size; to provide improvements in a revolving table core handling machine having a plurality of stations and at one of which the core is drawn. Other objects and advantages of the present invention will become more apparent as the description proceeds.

The drawings forming a portion of this specification illustrate one embodiment of the invention.

In the drawings:

Figure 2 is a top plan view of the apparatus with parts broken away to show details of the construction more clearly.

Figure 3 is a sectional detail view on line 3—3 in Figure 2.

Figure 4 is a sectional detail view on line 4—4 in Figure 2.

Figure 7 is a sectional view on line 7—7 in Figure 1.

Figure 8 is a sectional detail view on line 8—8 in Figure 1.

General description

Figure 1:
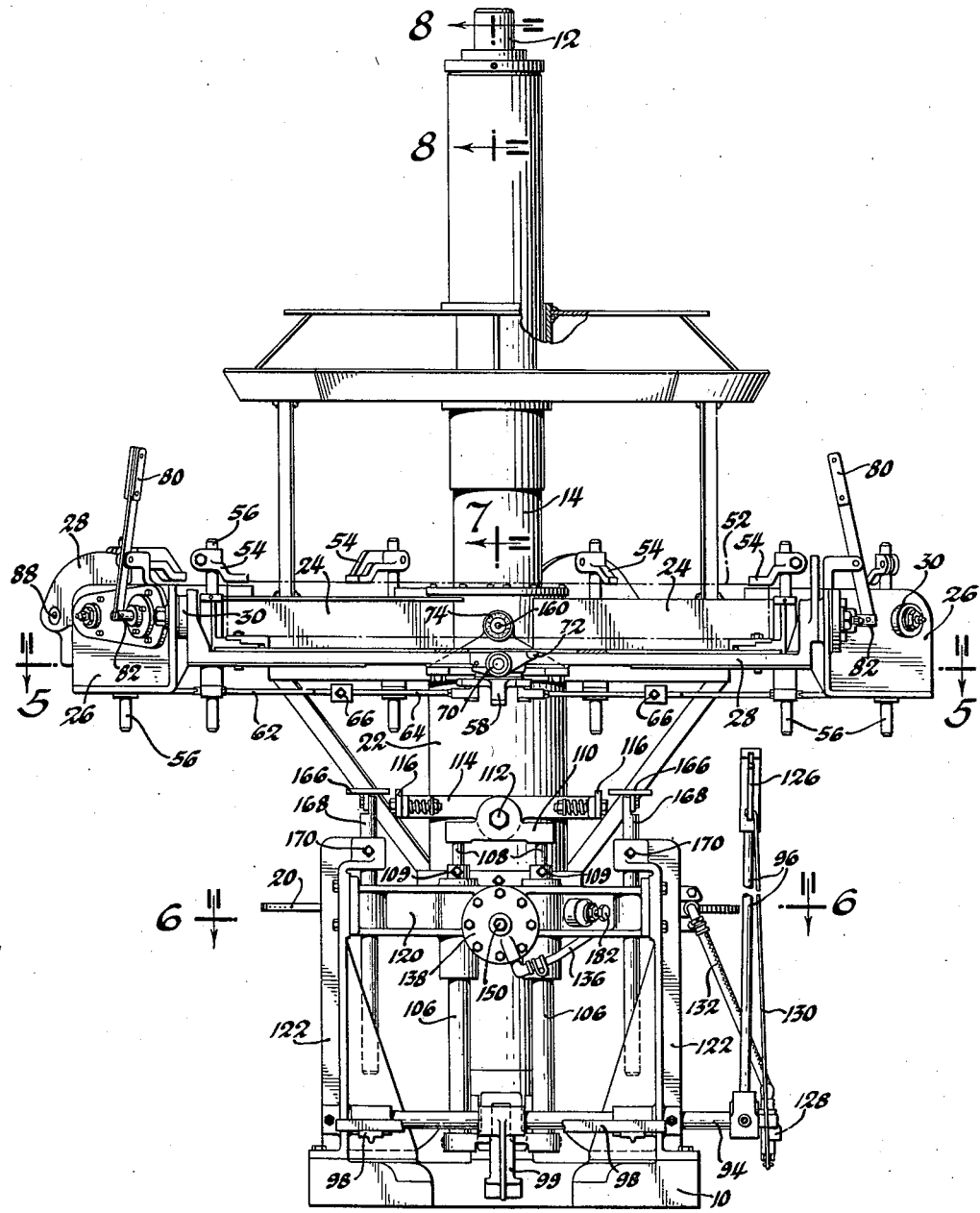
Figure 1 is an elevational view of the apparatus.

The embodiment of the invention shown in the drawings comprises an apparatus for use in connection with making cores, especially those of large sizes, for use in molding operations. The apparatus comprises a table rotatable about a center column and indexed at three stations, at the first of which the core box may be cleaned and made ready for forming the core. At this first station, core reinforcing wires or other members may be inserted in the box. The top of the core box is applied and the table rotated to bring the core box to the second station. At this station the core box is slid or otherwise removed from the machine and placed in a core blowing machine where the core sand is blown into the core box to form the core. If desired, the core may be formed without removing the core box from the table. Also, devices other than core blowing machines may be used for forcing the sand into the form of core desired. The filled core box is returned to the second station, securely clamped to the table and the top half of the core box removed and a core drier (a plate which supports the core while the core is being baked) is placed on the top of the bottom half of the filled core box. The table with the clamped bottom half of the core box and the core drier are rotated to the third and final station where the core drier and the lower half of the core box are then turned over. The bottom of the core box is then vibrated by an air actuated device as the core drier and core are lowered from the box. The core drier and core may then be placed in the oven for baking the core. The device is characterized by simplified adjustable means whereby the table can be raised or lowered and locked in adjusted position to accommodate other machines or for other purposes. Parts associated with the table are also readily adjustable to the adjusted height of the table. Controls are provided whereby the rotatable table must be in proper indexed position before the air supply can actuate the vibrator.

Detailed description

In the drawings is a base 10 having a center column 12 rising therefrom. A tubular housing 14 is rotatably supported on column 12 by means of an upper bearing 16 and a lower bearing 18. Fixed to the rotatable housing and supported thereby is a circular plate or disc 20. Also connected to the rotatable housing is a table assembly including a support 22 having fixed thereto three similar spokes 24 having flared ends 26 that are Y-shaped in cross-section. Three similar core box supporting devices 28 are rotatably mounted at 30 on the Y-shaped ends, each supporting device extending between the Y-ends of two of the spokes. Support 22 has a screw-threaded connection at 32 with a sleeve member 34 fixed to the tubular housing 14. A set screw 36 in support 22 has its free end 38 in a groove 40 in sleeve 34 and secures the support and sleeve in adjusted relation. By removing the end of the set screw from the groove 40 the support 22 and parts carried thereby can be rotated to adjust the height thereof, whereupon the set screw is tightened to secure the parts in their new positions.

Figure 5:
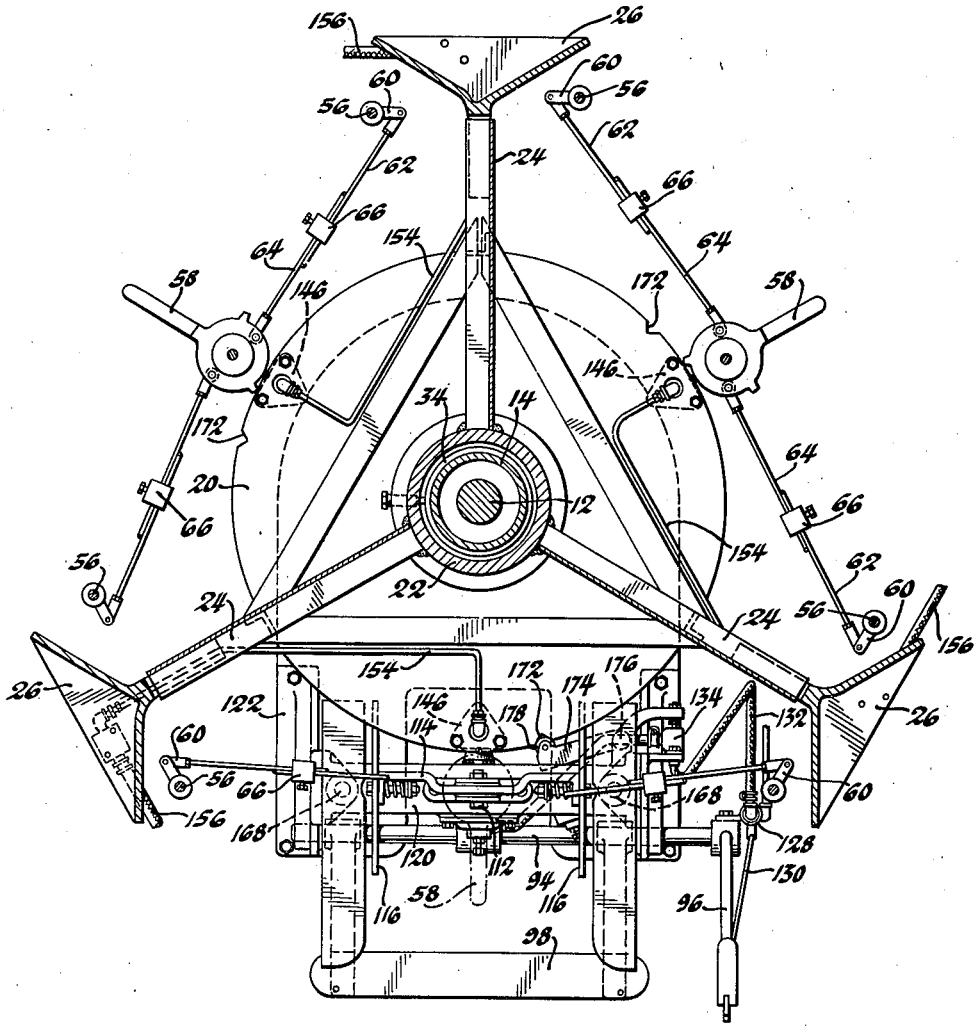
Figure 5 is a sectional view on line 5—5 in Figure 1.
Figure 6:
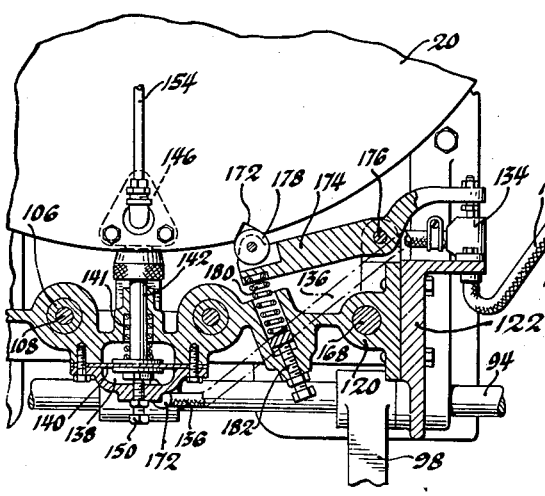
Figure 6 is a fragmentary sectional view on line 6—6 in Figure 1.

Referring especially to Figures 2 and 5 there are indicated first, second, and third stations. At the first station the core box is cleaned, placed on the table and then rotated therewith to the second station where the core box may be slid onto a core blowing device which blows core sand into the core box to form the core. The core box and formed core are then returned to the table at the second station and flanged edges of the core box are slid under wedges 50 so that the core box will be held securely to the table during withdrawal of the core at the third station. In Figures 2 and 7 the core box is indicated in dotted outline and is represented by reference numeral 52. At the second station the upper part of the filled core box is removed and a core drier (not shown) may be placed on top of the bottom portion of the core box and secured in proper position by means of clamps 54 (see also Figures 1 and 7). The clamps are secured to the upper ends of pins 56 which are carried by the table and are mounted for oscillation therein. Each of the pins and clamps carried thereby is adapted to be operated by handle 58 and linkage 60, 62, and 64. The extent of movement of the clamps may be varied by members 66 whereby the effective length of link members 62 and 64 may be increased or decreased.

Cam clamps 70 actuated by handles 72 force the core box and an air actuated vibrator 76 into engagement with a sealing member 74 formed of rubber or other suitable material. The seal 74 forms an air-tight joint for air flowing to the vibrator 76 at the third station as described in detail hereafter in this specification.

The table is then rotated to bring the bottom portion of the core box with the core drier thereon to the third station. At this station the handles 80 (see especially Figures 1, 2 and 4) are operated to withdraw pins 82 from holes 84 in supports 28 which carry the core box portion with the core drier clamped thereon. The support 28 is rotated 180° so that the bottom portion of the core box is brought into a position above the core drier which is still clamped thereto by clamps 54. Handle 80 is then released so that a coil spring 86 will force the pins 82 into openings 88 to thus secure the parts in their inverted positions.

Pivotally mounted in the frame of the machine adjacent the third station is a shaft 94 to which is fixed a treadle 98 and a hand lever 96. By means of linkage 99, 100, 102 and 104 (see especially Figures 1, 5, 6 and 7) the treadle and lever may raise tubular members 106 carrying rods 108. Set screws 109 are provided to fix the positions of the rods 108 with respect to the tubular members 106. In this way the effective lengths of the rods and tubes can be changed to accommodate the raising or lowering of the table. Members 106 are slidably carried in a cross member 120 carried by brackets 122. The upper ends of rods 108 contact opposite ends of a member 110 which is pivotally connected at 112 to an equalizer arm 114. At the opposite ends of the latter are resiliently mounted equalizer bars 116 which are adapted to be raised to contact and support the drier. The treadle is then held in position by the foot of the operator and the hands of the operator are free to move the handle 58 to move the clamping members 54 to unclamping position, thus freeing the core drier from the core box.

Trigger 126 pivoted to handle 96 is then depressed to open an air valve 128 by means of link 130. This permits air to flow through supply line 132, valve 134 and supply line 136 to an air cylinder 138 carried by cross member 120 (see especially Figures 6 and 7). In the rear of the air cylinder is a diaphragm piston 140 operated by the air pressure to move against the pressure of a spring 141 to force a rod 142 carrying a rubber air seal 144 into contact with a bracket 146 which is fixed adjacent the outer periphery of the disc 20. In the rod 142 is a passage 148 extending to the air cylinder, but normally closed by adjustable screw 150. When the diaphragm piston 140 and rod 142 are moved to the right as viewed in Figure 7 it moves the rod 142 away from the end of screw 150 and permits air to flow through passage 148 into a passage 152 in bracket 146, then to flexible air line portions 154, 156 and 158 to a passage 160 in the table and thence to the air vibrator 76. The seal 74 forms an air-tight connection between passage 160 and the vibrator. As the vibrator is actuated to vibrate the core box portion the lever 96 is moved backward allowing the core drier and core to be lowered from the core box portion. The core drier and core are lowered until the core drier rests on bars 166 which are carried by rods 168 fixed to the brackets 122. Set screws 170 are provided whereby the rods 168 may be fixed in raised or lowered positions depending on the adjustment of the table. The core drier and formed core may be then lifted by the operator and placed in an oven for baking the core. The several vibrators 76 may be carried either by the core box portions or by the turntable.

To prevent the vibrator from being operated when the table and core box portion carried thereby are not in proper position a safety control is provided. In the periphery of the disc 20 there are provided three similar V-notches 172. At the third station there is provided an arm 174 pivoted at 176 to a fixed portion of the frame. At one end of arm 174 is mounted a roller 178 and the roller is biased into contact with the periphery of the disc 20 by a spring 180. An adjusting screw 182 is provided to vary the spring pressure. As the roller is forced into each V-notch by the spring pressure the opposite end of arm 174 opens the valve 134. So long as the roller is riding on the periphery of the disc and is not within the V-notch the valve 134 is closed and consequently movement of trigger 126 and opening of air valve 128 will not permit actuation of the vibrator.

Various changes and modifications of the embodiment of my invention disclosed herein may be made by those skilled in the art without departing from the principles of my invention. I do not intend to limit the patent granted thereon except as necessitated by the prior art.

I claim:

1. In a device of the class described, a station at which a formed core may be withdrawn from a filled core box, a turntable for moving filled core boxes to said station, means for securing filled core boxes to said turntable, equalizing means at said station for supporting a core as it is being withdrawn from the core box, means for raising and lowering said equalizing means, an air actuated device for vibrating the core box as the core is being withdrawn, an air line to said air actuated device including portions movable with said turntable and stationary portions at said station, and means for preventing flow of air to said air actuated vibrating means unless the turntable is in proper position at said station.

2. A device as in claim 1, including means whereby the turntable may be raised or lowered and secured in adjusted position and the equalizer bars may be fixed in raised or lowered positions to accommodate the adjusted height of the table.

3. In a device of the class described, a station, an air line portion at said station, a turntable having a plurality of air line portions carried thereby and adapted to be rotated to bring successively each of said plurality of air line portions to a position adjacent the air line portion at said station, an air valve in the air line portion at said station opened by movement of the turntable when each air line portion carried by the turntable is in proper position at said station, and means operable when said air valve is open to seal the air line portion at said station to the adjacent air line portion carried by said turntable.

4. In a device of the class described, a turntable having a plurality of core box supports, means for securing a core box to each of said supports, air actuated means for vibrating each core box to assist in withdrawing a core therefrom, means for transmitting air to said vibratory means including an air line portion for each core box support carried by said turntable and a fixed air line portion, a valve in said fixed air line portion, and means for opening said valve only when the turntable is in proper position for removal of a core.

JOSEPH W. COMMON.